Oct. 22, 1968
W. JUDA
3,407,094
METHOD OF IN SITU PREPARATION OF HYDROGEN AND SIMULTANEOUS
HYDROGEN CONTROL IN ELECTROCHEMICAL CELLS
Filed Sept. 12, 1963
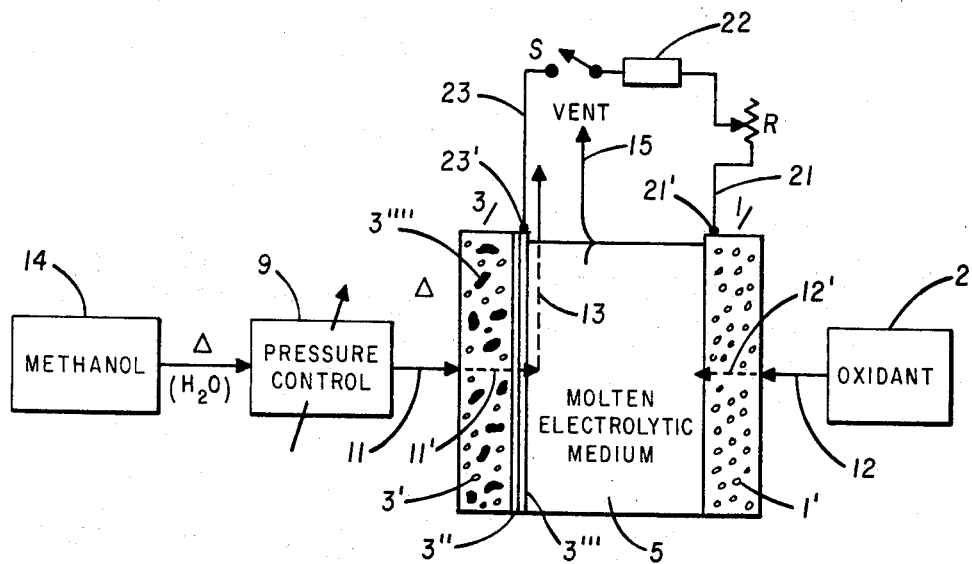
WALTER JUDA INVENTOR.
BY *Rines and Rines*
ATTORNEYS 3,407,094
METHOD OF IN SITU PREPARATION OF HYDROGEN AND SIMULTANEOUS HYDROGEN CONTROL IN ELECTROCHEMICAL CELLS
Walter Juda, Lexington, Mass., assignor to Prototech Incorporated, Cambridge, Mass., a corporation of Massachusetts
Filed Sept. 12, 1963, Ser. No. 308,418
10 Claims. (Cl. 136—86)

The present invention relates to methods of producing hydrogen from fuel-containing feeds and controlling the introduction of hydrogen so produced into electrochemical cells, and to novel hydrogen electrode means; being specifically, although not exclusively, directed to hydrogen electrode structures suited for in situ reformation of hydrogen in fuel cell systems and the like.

In copending application, Ser. No. 260,457 of Walter Juda, entitled, "Fuel Cell System and Method," filed on or about Feb. 25, 1963, there has been described fuel cell structures adapted for in situ preparation of, and the utilization of, gaseous hydrogen as a fuel that, when combined within an appropriate electrolytic medium with a suitable oxidant, will result in the generation of electric current between the electrodes that respectively pass the hydrogen fuel and the oxidant into the electrolytic medium of the cell. In connection, more particularly, with the hydrogen electrode, it has been proposed to employ therein a hydrogen-permeable palladium-containing layer that will permit diffusion therethrough of hydrogen but that is inherently impermeable to all other gases. Thus, if one employs an impure hydrogen fuel, containing carbon dioxide and other impurities, such as hydrogen gas obtained by reforming methanol or hydrocarbons or other carbonaceous fuels with steam, or by partially oxidizing hydrocarbons, for example, with air, the entry of these impurities into the electrolytic medium of the cell is automatically prevented by the impermeable character of an appropriate palladium-containing layer.

While it has been observed that pressurized hydrogen flow through an impervious silver-palladium anode responds to cell operation under electric load, the waste of hydrogen is excessive even when significant currents are drawn. The lower the permissible pressure of hydrogen at the palladium-containing electrode for any given (e.g., maximum) current drawn out of the fuel cell or the like, the better the electrochemical hydrogen utilization. If, indeed, the hydrogen fuel can be utilized below or near atmospheric pressure (at which the electrolytic medium may be most easily operated), the matter of instantly drawing current and inhibiting the withdrawal of current, as would be desirable in many commercial utilizations of fuel cells, can be treated without excessive losses of hydrogen fuel. This has been found possible in accordance with the present invention.

It is a primary object of this invention to provide a new and improved method of operating a hydrogen anode system as a component of an in situ system producing impure hydrogen fuel and utilizing the hydrogen near atmospheric pressure and below the same.

A further object is to provide a new and improved method of controlling the utilization of hydrogen in an electrochemical cell, including fuel cells and the like.

Still another object is to provide a new and improved hydrogen electrode means that, while particularly well suited for purposes of utilization in combined reforming systems and fuel cells and the like, is of more general utility, as well, wherever the advantageous features of such electrode means are desired.

An additional object is to provide a new and improved fuel cell and the like.

Other and further objects will be explained hereinafter and will be more particularly pointed out in connection with the appended claims.

In general, however, the invention relates to a method of and apparatus for providing in situ preparation, preferably reformation of crabonaceous fuels into hydrogen and simultaneous controlling of the utilization of the hydrogen in an electrochemical cell, that comprises, passing a carbonaceous fuel-containing feed into an anode system, carrying out an impure hydrogen-producing reaction, preferably reformation of the fuel, in situ in the anode system, interposing a hydrogen permeable palladium-containing layer in the path of the introduced hydrogen and in contact on opposite surfaces with the anode and an electrolytic medium; changing the pressure of the introduced feed relative to the pressure existing in the electrolytic medium of the cell, to a value insufficient to permit of substantial passage of hydrogen through the layer under open circuit; and valving and controlling the electrochemical utilization (i.e., the ionization of hydrogen) by drawing current from the cell, thereby causing the hydrogen to be selectively removed from the mixture and to pass through the layer at rates substantially exceeding the usual diffusion rates.

The term "anode system" as used herein comprises the anode and the means of producing impure hydrogen; it is arranged in a manner which insures heat exchange between the hydrogen-producing means and the electrochemical cell. For example, in the preferred case of in situ endothermic reforming of a fuel such as an alcohol or a hydrocarbon with steam, the anode system may be a porous carbon structure containing a reforming catalyst in contact with the palladium-containing layer which, in turn, is in contact with the electrolyte; alternately, the anode system may include an anode in the form of palladium-containing tubes and a catalytic reforming chamber in thermal contact with the hot cell container of a fused electrolyte cell, thereby exchanging heat therewith. In the latter case, the impure hydrogen is fed directly, as and when produced, from the catalytic chamber to the anode tubes. Thus, in the endothermic reforming processes so carried out in situ, the anode system takes advantage of the heat produced as an inefficiency in the cell. When impure hydrogen is produced from a mixture of fuel and oxygen or air, the exothermic partial oxidation is carried out, according to this invention, within the anode system; the thermal contact between the oxidation region and the cell thus permits heating the cell, whenever desired. Combinations of reforming and partial oxidations may be carried out either simultaneously or successively.

Cracking of fuels in situ to make hydrogen may also be used, especially cracking which produces only gaseous products. The preparation of hydrogen and other gaseous products by reforming, partial oxidation or cracking of alcohols, hydrocarbons or the like, all hereinafter generically referred to as carbonaceous fuel, at constant volume, involves usually a moderate increase in pressure, largely hydrogen pressure, as illustrated by the following typical reactions:

Reforming: $CH_3OH + H_2O \rightarrow CO_2 + 3H_2$
Partial oxidation: $CH_4 + \tfrac{1}{2}O_2 \rightarrow 2H_2 + CO$
Cracking: $CH_3OH \rightarrow CO + 2H_2$ Thus, the electrochemical "suction" of hydrogen as it is produced in situ in the anode system favors the equilibrium shift towards hydrogen when the cell is under load; in accordance with this invention, hydrogen is electrochemically utilized even when its partial pressure in the impure mixture produced in situ falls below atmospheric pressure. For example, if a mixture of methanol and steam is fed to an anode system at one atmosphere, the initial hydrogen partial pressure will be 1.5 atmosphere, assuming complete conversion. When the hydrogen partial pressure is allowed to drop to 0.25 atmosphere before exhausting the anode system, about 83.4 percent of the total available hydrogen permeates through the palladium-containing layer where it is efficiently utilized.

The invention will now be described in connection with the accompanying drawing, the single figure of which is a schematic diagram of a preferred fuel cell system, illustrating in situ reformation, cell construction and associated circuit controls for carrying out the method or process here involved.

Referring to the drawing, the method underlying the invention is shown for illustrative purposes as applied to a fuel cell system although, as before discussed, it may be employed in other electrochemical and similar cells wherever the advantages thereof are sought. A preferred cell is shown bounded by a pair of electrodes; one being a hydrogen anode system 3 and the other a porous cathode 1 into which a suitable oxidant may be fed from a source 2 along a path 12, through the porous cathode 1 at 12', and into an appropriate preferably molten electrolytic medium 5. The electrolytic medium 5 may, for example, be molten LiCl—KCl as later discussed; and an external Deacon process apparatus 2, such as described in the said application or in Chemistry and Industry, Jan. 13, 1962, W. F. Engel et al., "Recent Developments in Oxidative Recovery of Chlorine From Hydrochloric Acid," may be employed to introduce chlorine as the oxidant.

The hydrogen anode system 3 and the cathode 1, such as the chlorine cathode, comprise porous members in order to enable the introduction of hydrogen at 11' and oxidant at 12', respectively, into the electrolytic medium 5. Both the electrodes 1 and 3 may, for example, comprise porous graphite or other porous conductive supporting members 1' and 3', with the anode 3 being provided with a porous silver layer 3'' that has been secured to the porous carbon or similar support 3', as by sintering thereto, and a preferably thin palladium-containing layer or sheet 3''' connected with the silver layer 3''. As previously described, the palladium-containing layer will be impervious to all gases except the hydrogen fuel coming from the later-described reforming system; hydrogen inherently diffusing through the layer 3''' selectively.

Electrical conductors 21 and 23 are respectively connected, as at 21' and 23', to the cathode 1 and the anode 3 in order to enable the drawing of electric current out of the cell to an appropriate load, schematically illustrated at 22, when the electrical load circuit is completed, as by the closing of the switch S.

The hydrogen gas is illustrated as obtained from methanol, a hydrocarbon or similar carbonaceous fuels, a source of which is indicated at 14, and which is subjected to heat. Relatively impure hydrogen is applied to the anode 3, as before discussed.

The rate of movement of the hydrogen from the impure source through the palladium-containing layer 3''' is markedly controllable by the drawing of current in the output circuit 23–21 connected between the anode 3 and the cathode 1.

While it is not necessary that the exact theory of operation be fully understood, it being sufficient to describe the invention in terms of the steps and structure required to practice the same, and while we, accordingly, are not limited by an expression of opinion as to a possible theory, it is believed helpful to offer the following views.

When no current is drawn from the fuel cell, as when the load circuit is open-circuited, the diffusion of hydrogen ceases when the hydrogen pressure on the electrolyte-side of the palladium-containing anode equals that on the fuel side. Hydrogen is substantially insoluble in the electrolyte, and hydrogen bubbles tend to adhere to the anode film at the electrolyte interface. Hydrogen can be removed from this interface only by buoyancy and/or convection. In the case of a substantially "quiet" (no convection) incompressible liquid electrolyte, the total pressure (electrolyte head plus gas pressure above electrolyte) determines the hydrogen pressure and the buoyancy at the electrolyte interface. Thus, increasing the pressure on the electrolyte tends to slow, and eventually stop, the diffusion of hydrogen at open circuit, even when superatmospheric hydrogen is used on the fuel side of the anode.

When significant current is drawn from the cell, on the other hand, the hydrogen pressure on the electrolyte interface is substantially decreased through ionization. With high pressure hydrogen on the fuel side, the diffusion of hydrogen gas becomes rapidly excessive; that is, it exceeds the rate at which it can be electrochemically utilized by a wide margin, constituting a serious inefficiency. For example, it has been reported that, at 45 p.s.i. differential pressure, only about 12 percent and 21 percent of the hydrogen permeating through the film was electrochemically used at currents as high as 450 ma./cm.$^2$ and 810 ma./cm.$^2$, respectively.

In accordance with discoveries underlying the present invention, however, it has been found that hydrogen can be "sucked" electrochemically through hydrogen-pervious palladium-containing anodic films at rates far exceeding the usual rates of gaseous diffusion, this suction being capable of operating even when the hydrogen pressure on the fuel side of the anode is less than the total pressure on the anode-electrolyte interface; this suction resulting in a substantially complete electrochemical utilization of the hydrogen. In the preferred cells of the invention, where cells are operated at or near atmospheric pressure and at reforming temperatures (above about 200° C.) with molten electrolytes, we have found that hydrogen fuel pressures as low as one-fourth of an atmosphere are still adequate to draw good currents. It should be noted that the lower limit of about one-fourth atmosphere of hydrogen pressure on the fuel side of atmospheric molten-electrolyte cells refers to the hydrogen component of the fuel, which is the partial pressure of hydrogen in the "impure" hydrogen produced in situ during the drawing of current from the cell. Furthermore, when the pressure of the fuel-containing feed is kept below or near one atmosphere, the loss of diffused hydrogen gas (accompanying that which is being ionized), under current drain, can be rendered unimportant, instead of being a major loss. Under these conditions, the hydrogen permeating through the film is substantially completely (over 80 percent) utilized by electrochemical action when drawing maximum current from the cell.

The drawing of load current thus permits this "suction" of hydrogen through the hydrogen-permeable palladium-containing layer 3''' at rates significantly in excess of the diffusion rate of hydrogen in the absence of an electrical drain. Specifically, it has been found that a rather sharply defined valving action is provided by the opening and closing of the switch S. A reduction in the pressure of the hydrogen gas applied at 11 to the anode 3 to substantially the same order of magnitude as the pressure of the electrolyte medium 5 on the inner surface of the palladium-containing layer 3''', and preferably below the same, will enable substantially no diffusion when the cell is not being utilized to draw output current, and a substantially instantaneous transfer of hydrogen through layer 3''' upon closing of switch S, in an amount to at least satisfy the electrochemical requirement of the output current. Such operation of the source of hydrogen gas at reduced pressure (pressure less than that at the anode-electrolytic medium interface) eliminates not only the loss problems at the anode 3 at open circuit, but permits substantially complete electrochemical hydrogen utilization at maximum current drain and thus results in excellent hydrogen utilization.

In instances where corrosive attack of the palladium-containing layer 3''' is to be avoided by a hydrogen protective layer, the pressure may be reduced at 9 to permit only a slight passage of hydrogen in the absence of output-current drain. As before explained, operation of the source of hydrogen gas at such reduced pressure eliminates loss problems at the anode 3, results in better hydrogen utilization, and enables the instantaneous substantial utilization of hydrogen when current is to be drawn from the cell and the substantially negligible diffusion when the cell is in stand-by condition, even when extremely high temperatures are imposed, as in reforming, that would normally give rise to hydrogen diffusion even in the open-circuit condition of switch S. Thus the pressure at 9 is reduced below that of the electrolytic medium 5 to provide only a sufficient open-circuit-condition diffusion of hydrogen to provide an adequate hydrogen layer along the electrolytic-medium-exposed surface of the anode 3 to protect the same from corrosive effects of the electrolyte.

Palladium-containing films of the order of 0.0008" thickness have been made and experimentally used in diffusers of the above-described character, although films in the range of 0.0001" to 0.005" thickness are preferred. The palladium films, indeed, are available in leaf form. They may be silver-plated, rolled to the desired thinness, and then applied to the porous conductive carbonaceous support 3'. Alternatively, palladium or palladium-containing powders may be used to fill the surface pores of the conductive support, and the surface may be subjected to sintering temperatures whereby the porosity is eliminated.

Pure palladium metal has the drawback of changing crystal structure and failing when cooled in the presence of hydrogen. The diffusivity of hydrogen, furthermore, is improved by addition of some silver. The transition of the crystal structure is avoided by certain palladium alloys, especially Ag-Pd alloys; but also B-Pd alloys, and others. An Ag-Pd alloy containing about 70–75 percent palladium and 25–30 percent silver is especially advantageous in that it has no transition point in the presence of hydrogen and near maximum hydrogen diffusivity. The palladium-containing layer 3''', referred to above, includes palladium alloys, especially silver alloys, having these advantageous characteristics.

The addition of Ag to Pd forms a family of alloys which will withstand the formation of the transition state; other metals, such as Au, Cu, Fe, B, etc., accomplish the same purpose. The diffusivity of hydrogen, furthermore, is improved by the addition of the proper quantities of Ag. Other metals, such as Au, B, etc., behave similarly. Specifically, Ag-Pd alloy containing about 25% Ag is especially advantageous because it is both stable in use and represents maximum diffusivity as explained in U.S. Patent No. 2,773,561 to Hunter.

While particularly useful in the specific type of cell illustrated, it should be noted that hydrogen-permeable palladium-containing anodes are also especially useful in other types of fuel cells. A reforming anode (e.g., a methanol reforming anode) is advantageous in fuel cells operated at, say, methanol reforming temperatures. A palladium film anode permits the use of impure hydrogen containing $CO_2$ in an alkaline cell, for example, because of the built-in purification factor. The hydrogen-permeable palladium-containing anodes are, furthermore, useful, also, in the molten carbonate fuel cells, where the cell product is $H_2O$ and $CO_2$ evolved at the anode. The impervious palladium-containing anode avoids the dilution of the feed with these cell products.

If the Deacon process is employed to produce the chlorine oxidant at 2, the electrolyte 5 may include the alkali chlorides; for example, LiCl—KCl (58–42), operating at, for example, 400–420° C. The anode system 3 is a reforming anode characterized by the presence of two catalysts associated therewith; one adapted to reforming reactions which produce $H_2$ and $CO_2$ and/or CO from the fuel, and the second to ionize the hydrogen so produced. In this combined hydrogen-electrode and in situ-reforming system, copper and zinc reforming catalysts 3'''' may be deposited within the pores of the carbon support 3'. This may, for example, be effected by impregnating the carbon with zinc and copper sulfate, drying the same, precipitating with an alkali carbonate, and reducing with hydrogen as described, as an illustration, in U.S. Letters Patent No. 2,425,625. Operating this cell at or above the methanol or other fuel-reforming temperatures and at or near the temperature level of HCl oxidation by air in the Deacon process 2, provides a good match to the temperature at which the electrolyte 5 must be maintained in order to remain in the molten state; the heat exchange between the reforming procedure on one side of the layer 3''' and the molten electrolyte 5 on the other surface, providing a well-matched system. Alternately, a chamber comprising the reforming catalyst may be disposed in thermal contact with the hot container of the electrolytic medium; fuel and steam and/or air may be fed to said chamber, impure hydrogen is produced therein and conducted to the impervious palladium-containing layer acting as hydrogen anode.

In accordance with the utilization of the reformed hydrogen, the pressure-control apparatus schematically shown at 9 enables operation at or near the pressure at which the medium 5 is maintained and, preferably, below, as before stated. If the pressure of the medium 5 is atmospheric, the pressure of the fuel feed-producing hydrogen at 9 may be reduced to a value near atmospheric; say within minus five percent, as later explained. Once the valving action is commenced by the closing of the switch S and the withdrawing of current, a smaller degree of control within a limited range may be effected through variation of the potentiometer R, which enables variation of the current that is withdrawn and simultaneously a corresponding change in the hydrogen transfer rate.

As an example, in a system of the character shown, involving a Ag-Pd anode 3 in the form of a 1/16 inch outer diameter tube, 3 mils wall thickness, and 4.5 cm. long, a dense welding-rod carbon thimble provided with 1/16 inch holes drilled in the end thereof and about 1/2 inch diameter serving as cathode 1, and an electrolytic medium 5 of molten NaOH maintained at about 425° C., with anode 3 and cathode 1 spaced about 3 cm. apart in the melt, and with oxygen introduced at 12 with about 12 cm. of Hg pressure, it was found that reduction of the pressure of the hydrogen introduced at 11 below the pressure of the electrolytic medium 5, which was substantially atmospheric inside the cell, enabled substantially no diffusion of hydrogen through the layer 3''' into the cell 5 when the switch S was opened; but substantial passage of hydrogen therethrough substantially instantaneously upon the closing of the switch S and the drawing of current in the output circuit 23–21. When the cell was adjusted to draw substantially maximum current of the order of 165 ma., moreover, it was found that the ratio of the hydrogen-transfer rate through the layer 3''' when the switch S is open to the hydrogen movement rate under such maximum current drain when the switch S is closed, was of the order of 1 to 13. This ratio was found to be constant, moreover, for adjustment of the input hydrogen pressure within substantially plus or minus five percent of the atmospheric pressure of the medium 5. A typical ratio (at, for example, 2.5 cm. of mercury below atmospheric pressure) of the substantially negligible or unsubstantial hydrogen diffusion rate in the absence of drawing current to that under conditions of maximum current drain, was found to be 0.843 cm. of $H_2O$ pressure per minute to 10.97 cm. of $H_2O$ pressure per minute.

As another example, an LiCl—KCl eutectic medium 5 was operated at a temperature of about 420° C. with a Ag-Pd anode 3, 1/16 inch in diameter provided with a small end aperture and about 7 cm. long, and a carbon cathode 1, about 1/4 inch long and 5 mm. in diameter. Chlorine oxidant was introduced at 12 at about 32 cm. of Hg pressure. With the switch S open, so that no current was withdrawn in the output circuit 23–21, no bubbling of hydrogen in the vicinity of the inner or right hand surface of the layer 3''' was observed; but when current was drawn, large and rapid bubbling action of hydrochloric acid gas, escaping upward as at 13, was observed with a maximum current drain of 330 ma.; again proving the substantially instantaneous and effective valving action and control. Venting of water and the like may be provided at 15, as is well known.

Other halogens than chlorine may also be employed, as discussed in the said application, including, for example, NaBr—KBr and NaI—KI. In spite of the instability of HI at high temperatures, a hydrogen iodine cell of the above-described construction has been successfully operated to produce 0.94 volt at open circuit and 68 ma. of current at 0.16 volt, with a molten electrolytic medium 5 of KI (180 grams), NaI (360 grams) and KCl—LiCl (245 grams with 4:3 ratio) maintained at about 485° C. employing a Pd-Ag anode 3 compressing a 1/16 inch diameter tube, 3 mils thick, spaced about 2 cms. from an NC 60 porous carbon cathode 1 formed as a cylinder, 13 mm. in diameter and 1 cm. long. As another example, if a molten bromide electrolyte, such as similar proportions of NaBr or KBr with the KCl—LiCl melt above-described, is employed with a bromine cathode, the results obtained are similar, the hydrogen-bromine cell being intermediate the hydrogen-chlorine, hydrogen-iodine cells in performance.

As still another example, illustrative of the corrosion-protecting action of a small controlled diffusion rate at 13, a LiCl—KCl eutectic electrolyte was maintained molten at about 420° C. Into the electrolyte were inserted a 12 mm. diameter porous carbon cathode 1 about 1/4 inch thick and 9.15 cm. long, and a semi-circular Ag-Pd tubular anode 3, about 9.15 cm. long and 1/16 inch in diameter. With chlorine used as the oxidant and introduced at about 30 cm. of Hg pressure and with hydrogen pressure of the order of 15 cm. of Hg, the sharp and substantially instantaneous valving action was again observed, but with few large protective bubbles fixed to the Ag-Pd surface in the absence of output current and a seizable small-bubble flow observable when current of 240 ma. was drawn upon the closing of switch S.

Further modifications will suggest themselves to those skilled in the art and all such are considered to fall within the spirit and scope of the invention as defined in the appended claims.

What is claimed is:

1. A method of providing in situ production of hydrogen from carbonaceous fuels and simultaneously controlling the utilization of the hydrogen in an electrochemical cell, that comprises, passing a carbonaceous fuel-containing feed into an anode system in thermal contact with said cell, producing in situ impure hydrogen from said feed at a partial pressure of not more than about atmospheric during the drawing of current from the cell, interposing an anodic layer selectively permeable to hydrogen but impermeable to other gases in the path of the hydrogen and in contact with the electrolytic medium, and adjusting and maintaining the partial pressure of the hydrogen produced in situ to a value less than about atmospheric and less than the pressure existing in the electrolytic medium of the cell by drawing current from the cell.

2. A method as claimed in claim 1 wherein the cell is a fuel cell and in which an oxidant is introduced into the electrolytic medium through a further conductive layer disposed therewithin and the said current is drawn from the cell between the anodic and further conductive layers.

3. A method of providing in situ production of hydrogen from carbonaceous fuels and simultaneously controlling the utilization of the hydrogen in an electrochemical cell, that comprises, passing a carbonaceous fuel and steam into an anode system in thermal contact with said cell, reforming said fuel in situ into impure hydrogen at a partial pressure not more than about atmospheric during the drawing of current from the cell, interposing an anodic layer selectively permeable to hydrogen but impermeable to other gases in the path of the hydrogen and in contact with the electrolytic medium, adjusting the pressure of the feed to produce hydrogen in situ at a partial pressure less than about atmospheric during the drawing of current from the cell and less than the pressure existing in the electrolytic medium of the cell, and valving and controlling the electrochemical utilization of the hydrogen by drawing current from the cell to cause the hydrogen to pass through the layer and to maintain the partial pressure of hydrogen produced in situ less than about atmospheric and less than the pressure existing in the said electrolytic medium.

4. A method as claimed in claim 3, in which said layer is a palladium-containing layer.

5. A method as claimed in claim 3, in which said electrolytic medium comprises a halogen.

6. A method as claimed in claim 3, in which said electrolytic medium comprises a molten alkali hydroxide.

7. A method of providing in situ production of hydrogen from carbonaceous fuels and simultaneously controlling the utilization of the hydrogen in an electrochemical cell, that comprises, passing a carbonaceous fuel and steam into an anode system in thermal contact with said cell, reforming said fuel in situ into impure hydrogen, interposing an anodic layer selectively permeable to hydrogen but impermeable to other gases in the path of the hydrogen and in contact with the electrolytic medium, adjusting the pressure of the feed to produce hydrogen in situ sufficient to provide only a hydrogen covering for protecting the layer against corrosive attack of the said medium when no current is drawn from the cell and to permit a subtantial current to be drawn from the cell at a partial pressure of the hydrogen produced in situ less than about atmospheric during the drawing of current from the cell and less than the pressure existing in the electrolytic medium of the cell, and valving and controlling the electrochemical utilization of the hydrogen by drawing current from the cell to cause the hydrogen to pass through the layer.

8. A method as claimed in claim 7, in which the said pressure existing in the electrolytic medium of the cell is substantially atmospheric pressure.

9. A method as calimed in claim 7, in which the said partial pressure of the hydrogen produced in situ is maintained below its equilibrium value by the electrochemical suction of hydrogen through said layer as current is drawn from the cell in order to shift the equilibrium of the said reforming to increase the electrochemical utilization of hydrogen over the maximum available from external reforming.

10. A method of providing enhanced reformation of hydrogen-containing fuel and enhanced utilization of hydrogen in an electrochemical cell, that comprises, providing a non-aqueous molten alkali hydroxide electrolytic medium in contact with an oxidant cathode, maintaining said medium at fuel-reforming temperature in excess of substantially 400° C., providing an anode system with a thin layer selectively permeable to hydrogen but impermeable to other gases with one surface directly in thermal contact with the medium and the opposite surface in thermal contact with a chamber of reforming non-noble metal catalytic material of substantially greater thickness than the layer, passing hydrogen-containing fuel gas and steam into said chamber, partially reforming said fuel at said catalytic material to produce a reaction mixture containing hydrogen at a partial pressure of not more than about atmospheric during the drawing of current from the cell and carbon dioxide at said anode layer, closing a circuit between said anode layer and said cathode, and maintaining the partial pressure of hydrogen in the reforming mixture less than about atmospheric, less than the pressure existing in said electrolytic medium, and below its equilibrium value by electrochemical suction of hydrogen through said layer as current is drawn in said circuit in order to shift the equilibrium of said reaction and increase the electrochemical utilization of hydrogen over the maximum available from external reaction.

References Cited

UNITED STATES PATENTS

| | | | |
|---|---|---|---|
| 3,092,517 | 6/1963 | Oswin | 136—86 |
| 3,148,089 | 9/1964 | Oswin | 136—86 |
| 3,180,762 | 4/1965 | Oswin | 136—86 |
| 3,259,523 | 7/1966 | Faris et al. | 136—86 |
| 3,002,039 | 9/1961 | Bacon | 136—86 |
| 3,116,170 | 12/1963 | Williams et al. | 136—86 |
| 3,133,837 | 5/1964 | Eidensohn | 136—86 |
| 3,177,097 | 4/1965 | Beals | 136—86 |
| 3,180,763 | 4/1965 | Miller et al. | 136—86 |
| 3,202,546 | 8/1965 | Rightmire et al. | 136—86 |
| 3,206,333 | 9/1965 | Ehrenfeld | 136—86 |
| 3,216,861 | 11/1965 | Cohn et al. | 136—86 |
| 3,235,406 | 2/1966 | Cohn et al. | 136—86 |

FOREIGN PATENTS

| | | |
|---|---|---|
| 231,549 | 4/1959 | Australia. |
| 23,101 | 1892 | Great Britain. |

OTHER REFERENCES

Armed Services Technical Information Agency (ASTIA), Technical Documentary Report No. ASD-TDR-62-18, Regenerative Fuel Cell System, April 1962, TK 2920TS (only pp. 37 and 38 relied upon).

ALLEN B. CURTIS, *Primary Examiner.*